(12) United States Patent
Rajabali

(10) Patent No.: US 10,766,224 B2
(45) Date of Patent: Sep. 8, 2020

(54) PANEL MADE OF LAMINATES AND METHOD OF MANUFACTURING THE SAME

(71) Applicant: FOKKER AEROSTRUCTURES B.V., Papendrecht (NL)

(72) Inventor: Abdoelfaziel Rajabali, Alphen aan den Rijn (NL)

(73) Assignee: FOKKER AEROSTRUCTURES B.V., Papendrecht (NL)

( * ) Notice: Subject to any disclaimer, the term of this patent is extended or adjusted under 35 U.S.C. 154(b) by 282 days.

(21) Appl. No.: 15/306,215

(22) PCT Filed: Apr. 23, 2015

(86) PCT No.: PCT/NL2015/050274
§ 371 (c)(1),
(2) Date: Oct. 24, 2016

(87) PCT Pub. No.: WO2015/163764
PCT Pub. Date: Oct. 29, 2015

(65) Prior Publication Data
US 2017/0050411 A1 Feb. 23, 2017

(30) Foreign Application Priority Data
Apr. 25, 2014 (NL) .................................. 2012692

(51) Int. Cl.
*B32B 5/12* (2006.01)
*B32B 7/03* (2019.01)
(Continued)

(52) U.S. Cl.
CPC ................. *B32B 5/12* (2013.01); *B32B 3/28* (2013.01); *B32B 5/022* (2013.01); *B32B 7/03* (2019.01);
(Continued)

(58) Field of Classification Search
CPC ....... B32B 15/043; B32B 15/08; B32B 15/14; B32B 2260/021; B32B 2260/023;
(Continued)

(56) References Cited

U.S. PATENT DOCUMENTS

| 6,736,919 B1 | 5/2004 | Roebroeks |
| 2005/0089704 A1* | 4/2005 | Rajabali .................... B32B 3/10 428/544 |

(Continued)

FOREIGN PATENT DOCUMENTS

| GB | 2 486 120 A | 6/2012 |
| WO | 02/078950 A1 | 10/2002 |

OTHER PUBLICATIONS

International Search Report, dated Jul. 17, 2015, from corresponding PCT application.

*Primary Examiner* — Camie S Thompson
(74) *Attorney, Agent, or Firm* — Nixon & Vanderhye

(57) ABSTRACT

An integrated panel made of interconnected laminates includes stacked first and second metal layers (5, 5', 5") and fibre-reinforced adhesive layers (19) between adjacent metal layers. At the location of the transition from the outer surface (7) of the first outer metal layer (5) to the outer surface (7) of the second outer metal layer (4) is located a filler (11). The panel further includes a cladding layer (14), which includes at least one fibre material layer (15, 24) that extends over the filler (11) and the adjacent outer surface regions (12, 13) of the outer metal layers (5, 4) located on opposite sides and which are adhered to the outer surface regions.

18 Claims, 7 Drawing Sheets

(51) Int. Cl.
  *B32B 15/14* (2006.01)
  *B32B 37/00* (2006.01)
  *B32B 37/10* (2006.01)
  *B32B 38/18* (2006.01)
  *B32B 3/28* (2006.01)
  *B64C 1/12* (2006.01)
  *B32B 7/12* (2006.01)
  *B32B 27/04* (2006.01)
  *B32B 5/02* (2006.01)
  *B64C 1/00* (2006.01)

(52) U.S. Cl.
  CPC .............. *B32B 7/12* (2013.01); *B32B 15/14* (2013.01); *B32B 27/04* (2013.01); *B32B 37/003* (2013.01); *B32B 37/1009* (2013.01); *B32B 38/1808* (2013.01); *B64C 1/12* (2013.01); *B32B 2250/40* (2013.01); *B32B 2260/021* (2013.01); *B32B 2260/023* (2013.01); *B32B 2260/046* (2013.01); *B32B 2262/101* (2013.01); *B32B 2307/516* (2013.01); *B32B 2605/18* (2013.01); *B64C 2001/0072* (2013.01); *B64C 2001/0081* (2013.01); *Y02T 50/43* (2013.01)

(58) Field of Classification Search
  CPC .... B32B 3/10; B32B 3/08; B32B 3/28; B32B 7/12; B32B 7/005; B32B 2250/40; B32B 2262/101; B32B 2605/18; B32B 15/02; B32B 27/04; B32B 3/06; B32B 27/00; B32B 2250/44; B32B 5/12; B32B 37/003; B32B 7/03; B32B 38/1808; B32B 2260/046; B32B 2307/516; Y10T 428/12444; Y10T 428/17; Y10T 428/19; Y10T 428/192; Y10T 428/195; Y10T 428/24; Y10T 428/12; Y10T 428/12007; Y10T 428/12028; Y10T 428/24998; Y10T 428/12493; Y10T 156/101; Y10T 156/1011; Y10T 156/1023; Y10T 442/3415; Y10T 442/3423; Y10T 442/3447; Y10T 442/656; Y10T 50/43; B64C 1/12; B64C 2001/0072; B64C 2001/0081
  USPC .... 428/137, 189, 53, 57, 58, 60, 608, 299.4, 428/544, 315.9, 548, 77, 67, 55, 131, 428/195.1, 457; 156/196, 201, 60; 244/119, 131; 442/232, 233, 238, 378, 442/123.1; 52/801.1; 29/889.7
  See application file for complete search history.

(56) References Cited

U.S. PATENT DOCUMENTS

2007/0042214 A1\* 2/2007 Rajabali ................ B29C 70/885
  428/624
2008/0006741 A1 1/2008 Martin et al.

\* cited by examiner

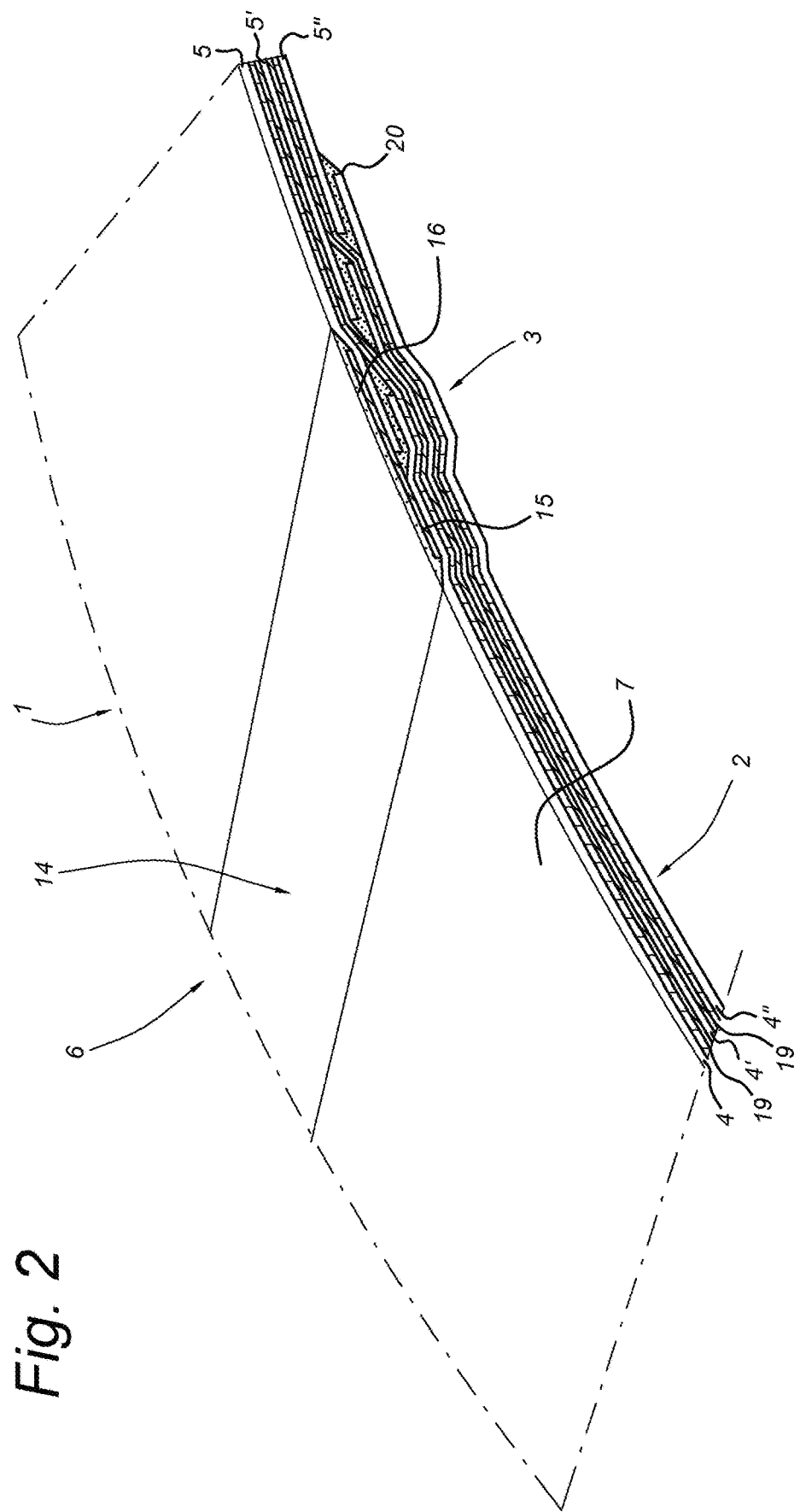

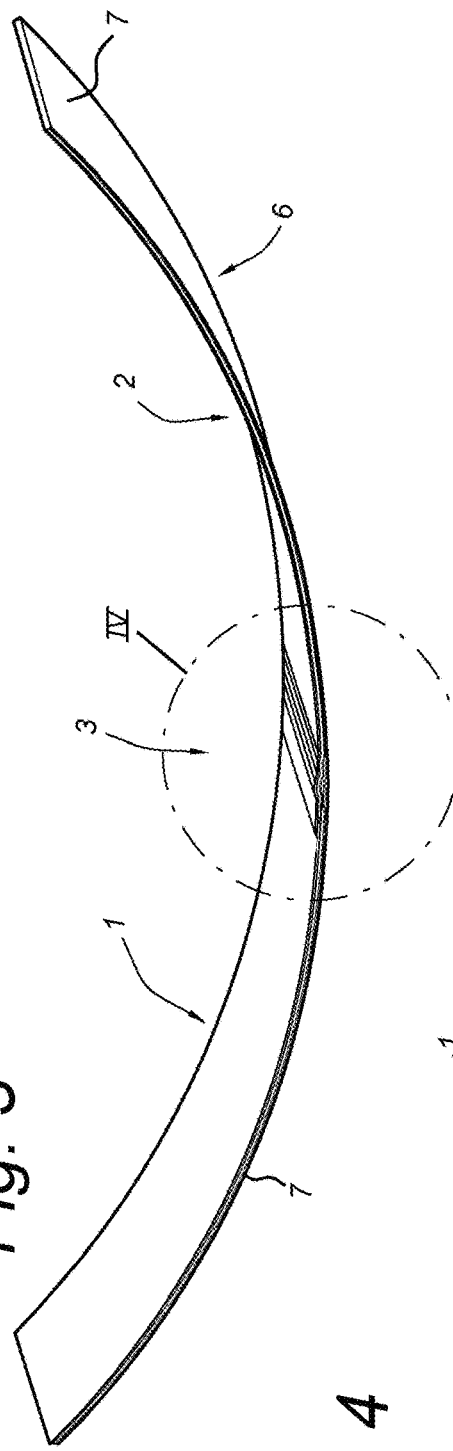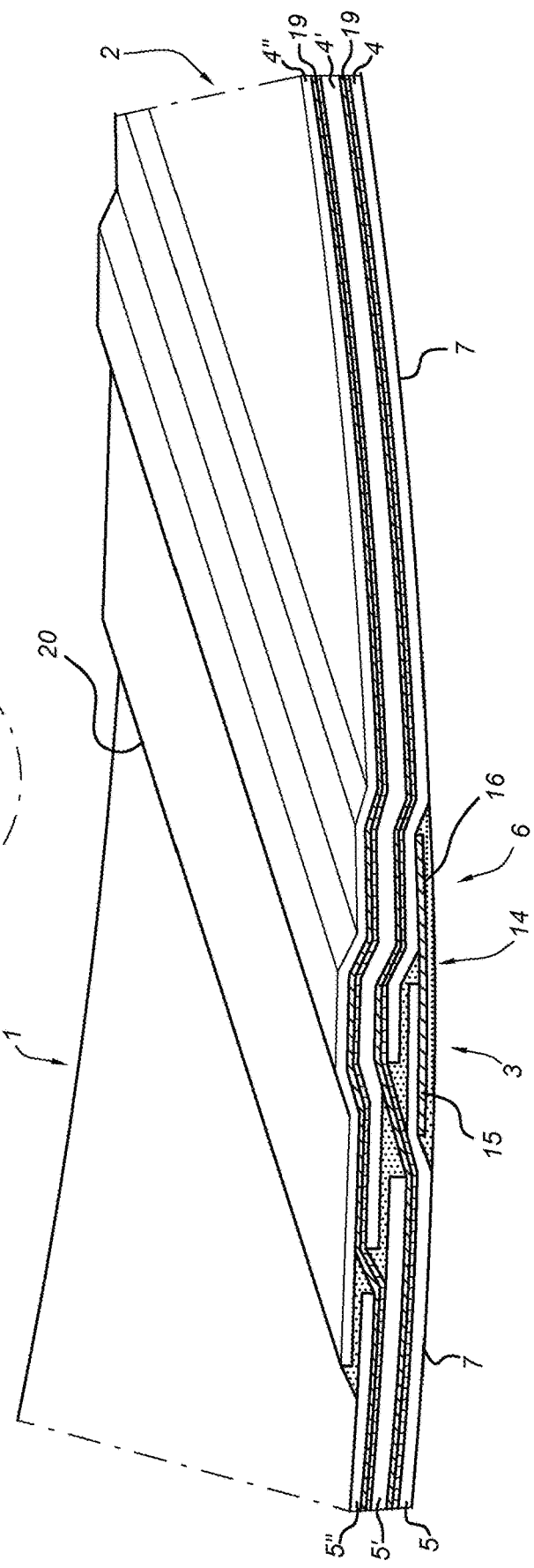

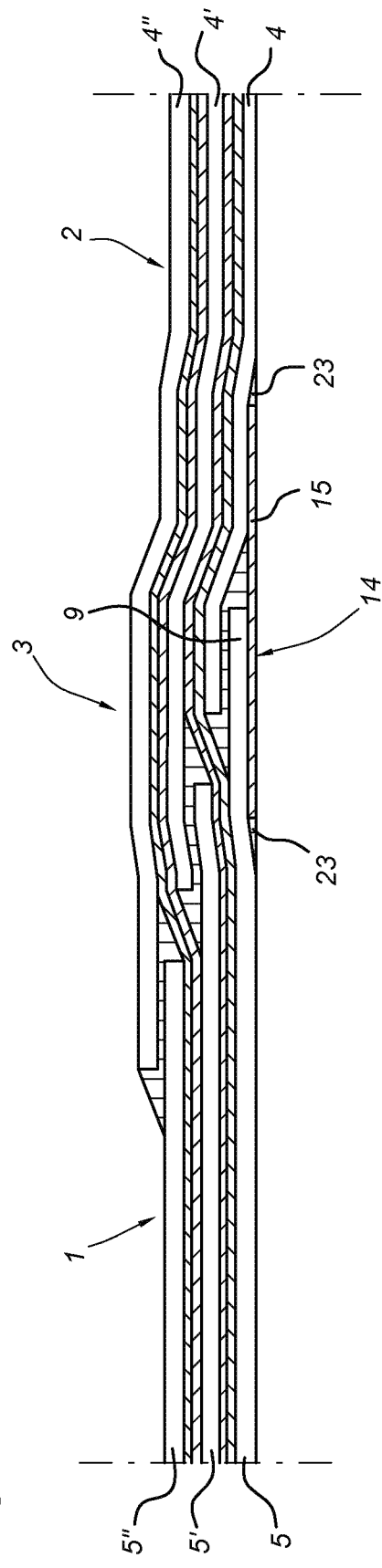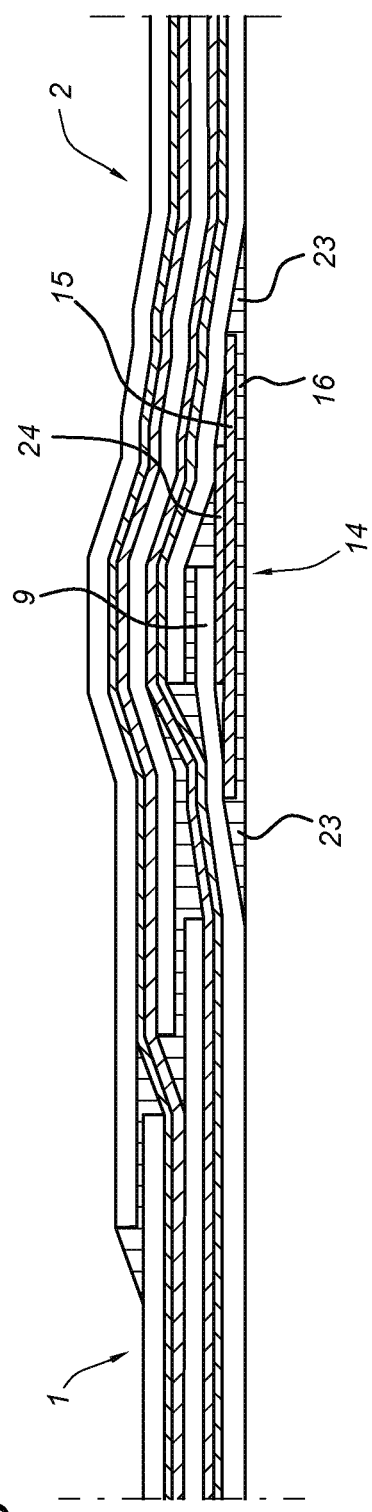

PANEL MADE OF LAMINATES AND METHOD OF MANUFACTURING THE SAME

BACKGROUND OF THE INVENTION

The present invention relates to an integrated panel of interconnected laminates which panel comprises a first laminate and a second laminate, in which the first laminate comprises stacked first metal layers and at least one fibre-reinforced adhesive layer between adjacent metal layers of the first metal layers, in which the second laminate comprises stacked second metal layers and at least one fibre-reinforced adhesive layer between adjacent metal layers of the second metal layers, in which, from the first and second metal layers of the laminates, a metal layer in turn forms an outer metal layer which defines an outer surface of that laminate and said outer surfaces define one and the same continuous and uniformly formed panel surface, in which, from a pair of outer metal layers that comprise a first outer metal layer of the first laminate and a second outer metal layer of the second laminate, the second outer metal layer exhibits a joggled edge section that overlaps an adjacent edge section of the first outer metal layer and that is adhered by means of an adhesive to an adhesion surface of the edge section of the first outer metal layer, which adhesion surface faces away from the panel surface, in which at the location of the transition from the outer surface of the first outer metal layer to the outer surface of the second outer metal layer a filler is located.

Such a panel of fibre metal laminates is known from WO-02/078.950-A1. A fibre metal laminate (FML) has an improved resistance against fatigue, particularly against crack propagation, compared with metal alloys, such as aluminium alloys. Damage resistance is a crucial objective in aerospace engineering. The behaviour of FML in structures such as aircraft structures, for example, FML panels such as fuselage panels from Glare® (glass-fibre composite between aluminium layers), with splices in accordance with the state of the art as known from WO-02/078.950-A1, can however be further improved.

After the manufacture of an FML laminate panel with a splice, a number of additional actions is needed to process the outer edge, so that a smooth outside is achieved that meets the aerodynamic and cosmetic requirements. These actions primarily involve post-processing the outermost filler which is mostly formed as adhesive squeezed out of the splice when manufacturing the panel. This squeeze-out of adhesive is prism-shaped and is freely on the outside of the aircraft. It is disadvantageous that this prism-shaped squeeze-out of adhesive after autoclaving often shows cosmetic imperfections such as small air bubbles, which then have to be post-processed as part of the production process by scratching open, grinding, cleaning, filling with adhesive, hardening for 24 hours, regrinding and painting. That results in a disadvantageous extension of the process for production of such FML laminate panels with one or more splices, in terms of production actions and time.

At the location of the outermost splice overlap, the outer surface of the end region of the outermost metal layer is free, and the thin edge of the outermost metal layer is adhered on the abutting edge to the adjacent outermost prism-shaped squeeze-out of adhesive of the aircraft fuselage panel. This abutting adhesive bonding is unfavourable. In terms of design, adhesive bonds in FML laminates are good at withstanding shear and less good at withstanding tensile forces. The abutting adhesive bonding of the metal edge on the prism-shaped squeeze-out of adhesive, however, is subject to tensile forces, which is not desirable. Due to the repetitive flights of the aircraft, cyclical loads occur in the form of temperature effects (being between −55° C. and 100° C.) and cyclical mechanical load and deformation of the fuselage (cabin pressure and bending moments). Due to these cyclical loads, the outermost squeeze-out of adhesive at the location of the aluminium edge is sensitive to the occurrence of hairline cracks (micro-cracks). If these occur in a painted FML laminate panel, then these would be visible on the outside of the aircraft as cosmetic imperfections in the form of micro-cracks in the paint layer.

Furthermore, in the known splice the outermost metal-metal overlap is provided with a supported adhesive material (provided with a nylon carrier) and the outermost prism of squeeze-out of adhesive comprises a non-supported adhesive material (without carrier), in order to avoid the nylon carrier being able to be drawn from the laminate when processing the prism-shaped squeeze-out of adhesive. Given that supported adhesive is applied in the overlap between the two metal layers, therefore, an extra production action is necessary to deposit the non-supported adhesive for the adjacent outermost prism of squeeze-out of adhesive.

A panel of the type described in the preamble is also found in the book: "Fibre Metal Laminates, an Introduction", edited by Ad Vlot et al., Kluwer 2001, pages 267-280, Chapter 17: "Detailed design concepts" by O. C. van der Jagt et al.

FML laminates are made as sandwich components of unidirectional glass fibre prepreg, adhesive materials and thin metal plates, for example aluminium plates, assembled onto each other by stacking on a mould. A glass prepreg is a glass fibre mat which is embedded in a matrix material. The metal plates are laid over each other, overlapping in the mould to form splices. After the stacking process, the mould with the product is placed in an autoclave. After that, the product is adhered together in the autoclave under high pressure and high temperature and hardened. As a result of this, a laminate product emerges with a smooth mould side, which also forms the outside of the aircraft.

SUMMARY OF THE INVENTION

The aim of the invention is to create a panel that does not have the aforementioned disadvantages. That aim is achieved by the panel further comprising a cladding layer, which cladding layer comprises at least one fibre material layer that extends over the filler and the adjacent outer surface areas of the outer metal layers located on opposite sides of the filler and that is adhered to the outer surface areas and the outer side of the cladding layer being formed by an adhesive layer or by a fibre layer embedded in an adhesive material.

This has the advantage that the outermost prism-shaped squeeze-out of adhesive of the splice of the outermost aluminium layers is effectively covered by the local cladding which, for example, may consist of a layer of adhesive and bridging glass fibres embedded in it. This cover prevents cosmetic imperfections such as small air bubbles from forming during autoclaving, which are in the line of sight and for this reason would have to be post-processed. As a result, post-processing steps such as scratching open, grinding, cleaning, filling with adhesive, 24 hour hardening, regrinding and painting are dispensed with, which results in a more efficient production process.

Furthermore, the bridging outermost fibre material layers are used as a bridging of tension from the edge region of the outermost metal layer from the outermost splice overlap to the filler or prism-shaped squeeze-out of adhesive and to the adjacent region of the innermost metal layer of the outermost splice overlap, by which the tensions well before and after the splice overlap region gradually build up and recede.

The laminate product is thus in a position to absorb cyclic loads for a longer period of time, such as, for example, when using as a wall panel of an aircraft, in which, due to the repetitive flights, cyclical temperature effects (going from between −55° C. and 100° C.) and cyclic mechanical load and deformation of the fuselage (cabin pressure and bending moments) occur. The laminate product in accordance with the invention can withstand these cyclical loads for a longer duration and more often without micro-cracks occurring. The panel with bridging glass fibres over the outermost splice is thus resistant to a larger number of flight cycles than the panel according to the state of the art.

A further advantage is that now a supported adhesive material can be used for the outermost prism of squeeze-out of adhesive, given that the cladding layer protects this prism of squeeze-out of adhesive effectively from egression of the nylon carrier when processing the prism of squeeze-out of adhesive. Therefore, for forming both the adhered outermost metal-metal overlap and the outermost prism of squeeze-out of adhesive, only one single strip of supported adhesive material is needed which covers both the overlap and the prism. This saves on production actions, because no non-supported adhesive is necessary.

The splice region encased with glass prepreg and adhesive material further ensures that moisture and chemicals from the outside of the aircraft cannot penetrate along the outermost squeeze-out of adhesive, and cannot penetrate into the seam of adhesive of the outermost splice overlap.

A further panel is disclosed in US2008/0006741. Said prior art panel is related to skin panel for an aircraft fuselage, which panel consists of a number of overlapping metal layers which are adhered to each other through fibre-reinforced adhesive layers forming a stepped connecting region which is oriented in circumferential direction. A metal strip covers said stepped connecting region at the outside of the panel. The transition between this outer metal strip and the adjacent outside surface areas of the stepped region is not smooth but instead has an abrupt character. This is at variance with providing an aircraft structure which meets the aerodynamic and cosmetic requirements as addressed before.

According to the invention, the cladding layer is limited to the region as defined by the filler and the adjacent outer surface areas of the outer metal layers, leaving free the remaining regions of said outer metal layers. Said remaining regions are larger, for instance at least one order of magnitude larger, than the region covered by the cladding layer.

The at least one fibre material layer of the cladding layer may comprise fibres embedded in an adhesive material. The cladding layer may define an outer surface of the cladding layer and said outer surface of the cladding layer may define the panel surface.

In particular, the outer surface defined by the cladding layer may coincide with the panel surface. The cladding layer can furthermore also be adhered to the filler. Preferably the first and second laminates are joggled inward at the location of the cladding layer. Thus the smooth contour, uninterrupted in terms of aerodynamics, of the outside of the panel is maintained.

The fibre material layer may comprise a fibre layer, such as a glass fibre layer, which is embedded into an adhesive material. This embedded fibre layer may form the outside. This means that the adhesive material of the embedded fibre layer may form the outside of the cladding layer. Furthermore, in this embodiment fibres of the fibre layer may be present at, may be bounded by and/or may be tangent to the outside surface, thus forming and defining the outside surface of the cladding layer together with the adhesive material of the embedded fibre layer. Yet according to a variant the outside of the cladding layer may alternatively be formed by a layer of adhesive. Furthermore, the cladding layer may comprise several fibre material layers which are adhered to each other. In that case, it is preferably provided that a more outward located fibre material layer, viewed along the outer surface, extends in relation to a more inward located fibre material layer. To maintain the smooth outer contour of the panel, in this case, the laminates may be joggled over the first distance at the location of a more outward located, extending fibre material layer, and be joggled over a second distance at the location of a more inward located fibre material layer.

Preferably, the fibre direction of the fibre material layer(s) is oriented transverse in relation to the edge of the edge section of the first outer metal layer. Furthermore, a fibre-reinforced adhesive layer may comprise fibres which are oriented transversely in relation to the edge of the edge section of the first outer metal layer. In addition, a further fibre-reinforced adhesive layer may be provided which comprises fibres which are oriented in the same direction as the edge of the edge section of the first outer metal layer. As mentioned, the fibres of the fibre-reinforced adhesive layer(s) and/or fibres of the fibre material layer(s) may comprise glass fibres. In particular, the fibre material layer(s) may comprise a prepreg of unidirectional fibres which are embedded in a matrix material. The fibre-reinforced adhesive layer(s) may be continuously extended from the first laminate to the second laminate.

The adhesive between the edge sections of the mutually overlapping metal layers may comprise a supported adhesive, such as a mat which is embedded in glue. In this way, the filler between both outer metal layers may consist of glue. In that case, as mentioned, the filler may be prism-shaped, such as a prism with a triangular cross-section delimited by the inclined side of the joggled edge region of the joggled second outer metal layer, the abutting edge of the first outer metal layer and the surface of the filler that is covered by the cladding layer. The filler may be formed as squeeze-out of adhesive between the mutually overlapping edge sections of the outer metal layers.

The invention also relates to a method for manufacturing a panel, comprising the steps of:
 Creating a mould the mould surface of which exhibits the shape of an outer surface of a panel to be manufactured,
 Placing a first metal layer that exhibits an edge section onto the mould surface,
 Placing a second metal layer that exhibits an edge section on the mould surface, so that the edge section of the second metal layer overlaps the edge section of the first metal layer, in which is provided an adhesive between the overlapping edge sections,
 Placing at least one fibre layer embedded in adhesive or prepreg on the metal layers,
 Placing a further metal layer on the at least one fibre layer embedded in adhesive,
 Any repetition of the steps of placing a fibre layer embedded in adhesive on the previously placed metal layer and fibre layer, and placing a further metal layer onto the fibre layer, Covering the thus formed package of metal layers and fibre layers embedded in an adhesive with an air-tight film, Sealing around the package of the film in relation to the mould, Extraction of gasses from the space formed between the film and the mould and thus generating a pressure on the package, Consolidating the package by putting the package under increased pressure and heating, Under the effect of pressure and heat, forming a joggle in a metal layer of each pair of mutually overlapping metal layers, and Under the effect of pressure and heat, forming a surface oriented towards the mould surface of the package in accordance with the shape of the mould surface.

Such a method is known. To achieve the panel in accordance with the invention, the method comprises the additional steps of:

Before placing the first pair of mutually overlapping metal layers on the mould surface, placing on the mould surface a cladding layer comprising at least one fibre material layer, Then placing the first pair of mutually overlapping metal layers in such a way that adjacent outer surface regions thereof which are located on the opposite sides of the transition between those metal layers are in contact with the cladding layer, Adhesive bonding under the effect of pressure and heat during the consolidation step of the cladding layer to those adjacent outer surface regions of the first pair of mutually overlapping metal layers.

Furthermore, the method may comprise joggling the packages of metal layers and fibre layers embedded in adhesive under the effect of pressure and heat at the location of the cladding layer, so that the smooth outer contour of the panel is ensured.

The method may also comprise the steps of:

Pressing under the effect of pressure and heat of at least a part of the adhesive between the overlapping edge regions outwards, Forming an adhesive filler from the adhesive squeeze-out of adhesive into the space delimited by the inclined side of the joggled edge region of the joggled second metal layer, the abutting edge of the first metal layer and the cladding layer.

The cladding layer may be formed from at least one fibre layer embedded in adhesive or prepreg which is placed directly onto the mould surface. As a further possibility, the method may comprise forming the cladding layer from at least one adhesive layer which is placed directly onto the mould surface, and at least one fibre layer embedded in adhesive or prepreg which is placed on the adhesive layer.

BRIEF DESCRIPTION OF THE DRAWINGS

In the following, the invention will be explained in more detail using the figures.

FIG. 2 shows the outside of the panel in accordance with FIG. 1.

FIG. 3 shows a further view of the splice of the panel in accordance with FIG. 1 and FIG. 2.

FIG. 4 shows the splice in accordance with IV of FIG. 3, in greater detail.

FIG. 7*a-e* show the further variants of the splice in cross-section.

DETAILED DESCRIPTION OF THE PREFERRED EMBODIMENTS

Figure 1:
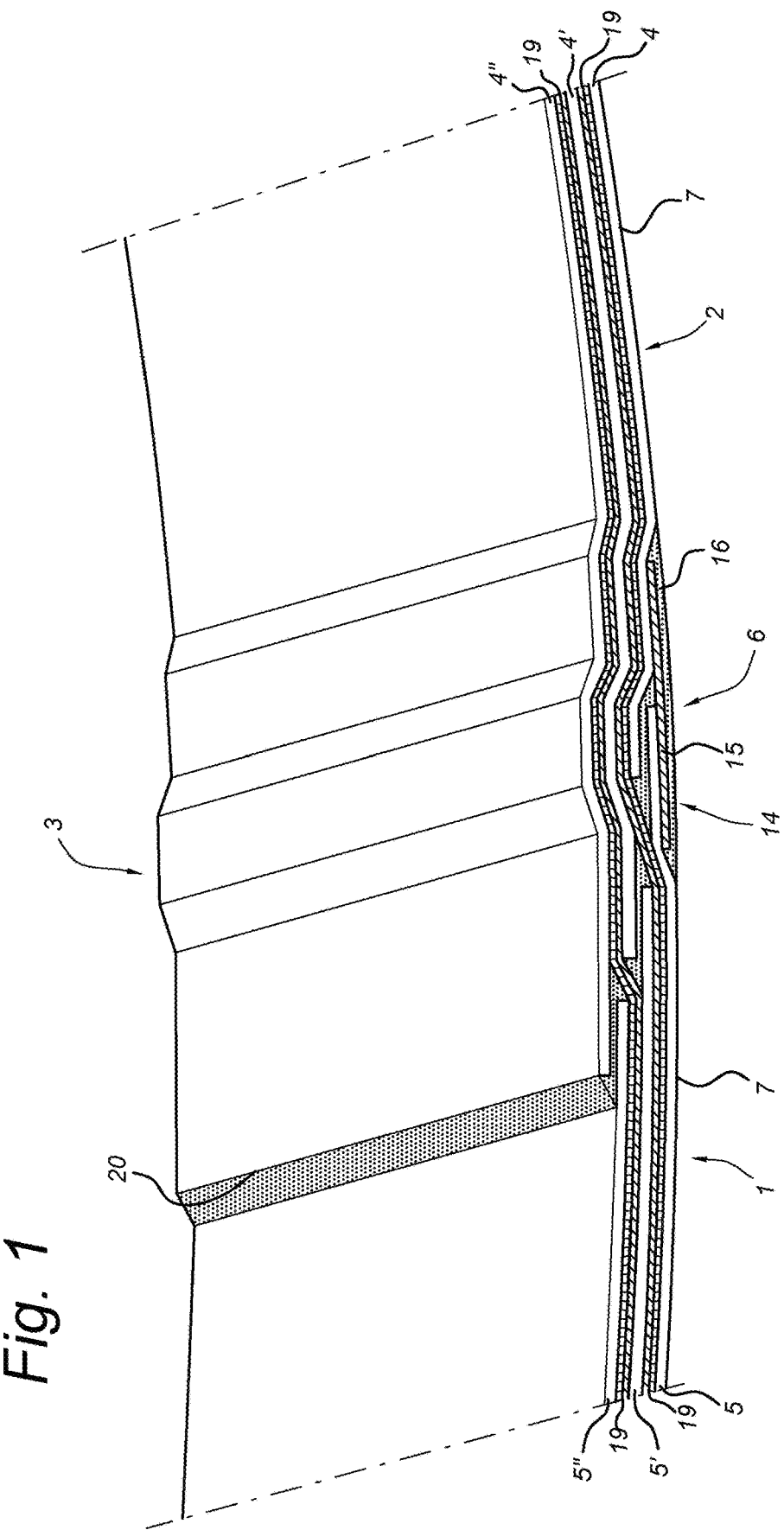
FIG. 1 shows a cross-section and a perspective view of the inside of a curved panel with a splice, such as for an aircraft fuselage.

The panel shown in FIG. 1-4 consists of a first laminate 1, and a second laminate 2, which are interconnected by the splice indicated as a whole by 3. The first laminate 1 consists, in the example shown, of three metal layers 5, 5', 5", and the second laminate 2 of three metal layers 4, 4', 4", and the fibre-reinforced adhesive layers 19 located in between. In the illustrative example shown, both fibre-reinforced adhesive layers 19 each consist of two layers of fibre material embedded in adhesive or prepregs 19. The orientation of the fibres in these prepregs 19 differs, and one prepreg is preferably oriented parallel to the edges 20 on the ends of metal layers 4, 4', 4" and 5, 5', 5", while the orientation of the fibres in the other prepreg may be oriented perpendicular to these edges 20. The metal layers 4, 4', 4" and 5, 5', 5" are discontinuous at the location of the splice and mutually overlap as explained below, while the fibre-reinforced adhesive layers 19 extend continuously through the splice from one laminate 1 towards and into the other laminate 2. When using the panel, on the outer side a continuous and uniformly shaped panel surface 6 is defined by the outer surface 7 of the pair of metal layers 4, 5. Because these metal layers 4, 5 are located on the outside of the panel, these are also indicated as outer metal layers 4, 5.

Figure 5:
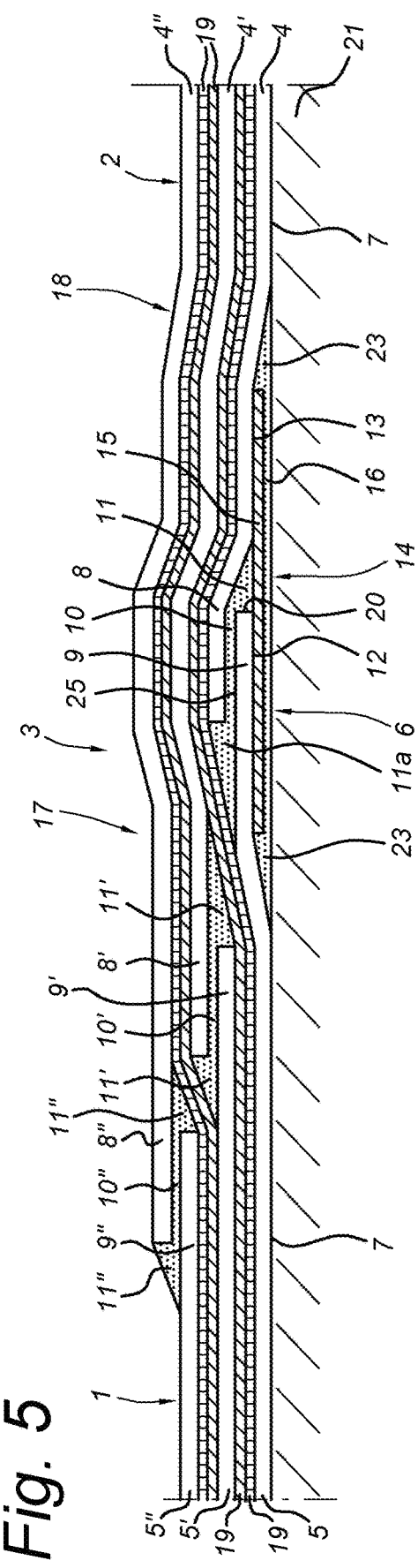
FIG. 5 shows the details of the splice in accordance with FIG. 1-4 at a larger scale and in cross-section.

In the enlarged cross-section of FIG. 5 it can be seen that one of the outer metal layers 4 has a joggled edge section 8 that overlaps an adjacent edge section 9 of the other outer metal layer 5 and that is adhered by the adhesive layer 10 to an adhesion surface 25 of that other edge section 9. The more inwardly located pairs of metal layers 4', 4" and 5', 5" are also adhered to each other at the location of an overlap at the location of the joggled edge sections 8', 8" and the straight edge sections 9', 9" and are interconnected there by the adhesive layers 10', 10". In all these connections, what are called adhesive prisms or fillers 11, 11a, 11', 11" are formed when manufacturing the panel. These adhesive prisms 11, 11a, 11', 11" arise due to the adhesive layers 10, 10', 10" being squeezed out between the mutually overlapping edge sections 8, 9, 8', 9', 8", 9" under the effect of heat and pressure and thus having filled the triangular prism-shaped areas (triangular in the cross-section in FIG. 5) at the transitions between the mutually overlapping metal layers.

In practice, it appears that the outermost adhesive prism 11 that is located between the outer metal layers 4, 5 can give rise to cosmetic imperfections such as air inclusions, cracks and similar. In particular, these may arise on the abutting edge 20 of the straight edge section 9 of the metal layer 5 of the first laminate 1. With the aim of counteracting such imperfections, over the surface regions 12, 13 of the outer metal layers 5, 4 of both laminates 1, 2 a cladding 14 is applied. These outer surface regions 12, 13 are located on opposite sides and directly adjacent to the outermost adhesive prism 11. In the illustrative example of FIG. 5, cladding 14 consists of a layer of fibre material embedded in an adhesive (fibre-reinforced adhesive layer) or prepreg 15 and an adhesive layer 16 extending over the outside. The orientation of the fibres in this prepreg 15 is preferably oriented perpendicular to the edge 20. The outer surface of this adhesive layer 16 coincides in the finished panel with the contour of the panel surface 6. Given the prepreg 15 and the adhesive layer 16 exhibit a small, yet definite thickness, during the manufacture of the panel, joggles 17 or 18 respectively occur in the laminates 1, 2. Thus on the extremities of the cladding 14, also minuscule adhesive prisms 23 are formed.

Figure 6:
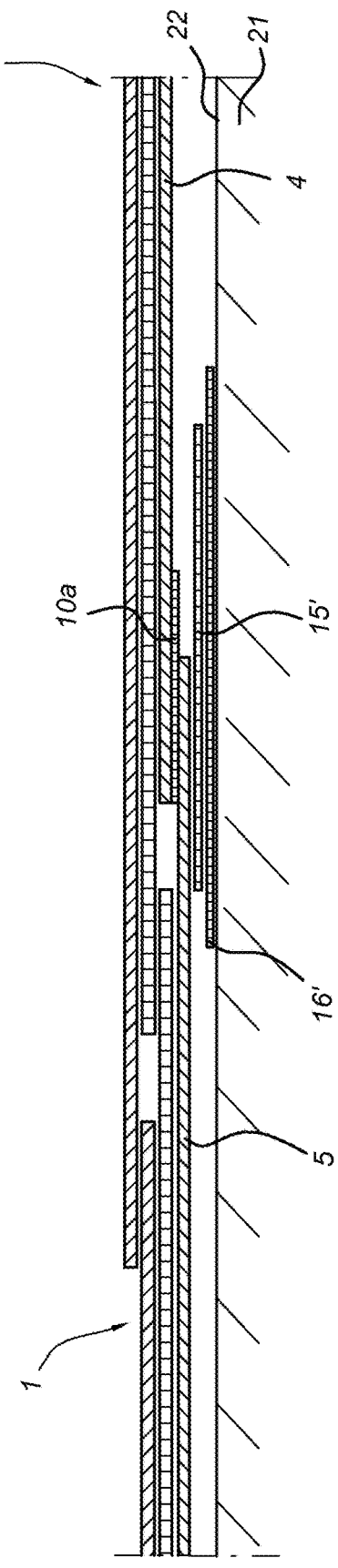
FIG. 6 shows the stacking of layers on a mould during the manufacture of the panel in accordance with FIG. 1-5.

As already mentioned, the various joggles in the panel described above are achieved by shaping them under heat and pressure on a mould. As shown in FIG. 5 and FIG. 6, when manufacturing a panel, a mould 21 with the desired mould surface 22 is used. On this mould surface 22 the various layers of the panel described above are deposited and stacked. In that context, as a first stage, a precursor 16' of the adhesive layer 16 is deposited in a solid form onto the surface 22. Then, on top of that, a precursor 15' of the fibre-reinforced adhesive layer (prepreg) 15 is placed; these precursors 15', 16' will eventually form the solid adhesive layer 16 and the fibre-reinforced adhesive layer 15 of the cladding 14 after the panel has been manufactured. After that, the outer metal layer 5 of the first laminate 1 is laid over the left section of the precursors 15', 16'. On top thereof, a precursor 10a of the adhesive layer 10 is laid. This precursor 10a may, for example, comprise a mat which is embedded in glue.

Over the precursor 10a of the adhesive layer 10, the outer metal layer 4 of the second laminate 2 is laid, after which the further metal layers and fibre-reinforced adhesive layers are placed one after the other. All these layers are initially still flat. This package is then accommodated under an airtight film which is sealed in relation to the mould 21, and the whole is subjected to pressure by vacuum extraction and heating at the same time (autoclave). In this way, the layers in the package are firmly adhesively bonded to each other and the various joggles are obtained as shown in FIG. 5. This process to obtain the joggles is also called the self forming technique. Treatment with increased pressure and heating further causes the prepreg 15 at both ends to be adhered over a certain length to the metal layers 4, 5, by which a shear connection is achieved. Then the panel is complete.

Figure 7C:
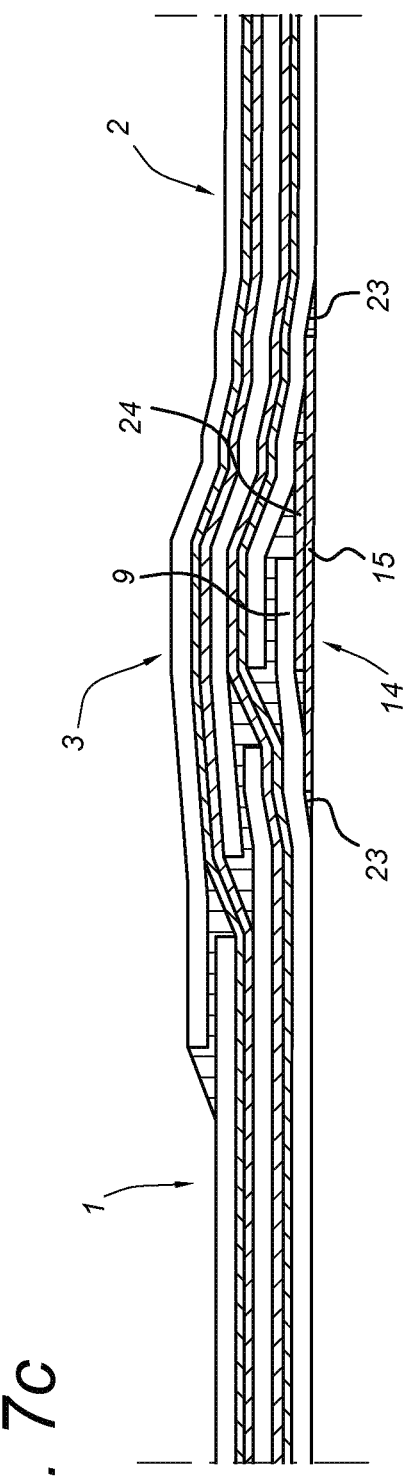

The variant of FIG. 5 forms only one of the many possible embodiments of the panel in accordance with the invention. Further possible embodiments are, but not exhaustively, shown in FIG. 7a-e. In the variant of FIG. 7a, the cladding 14 only consists of the prepreg 15, without there being underneath (on the panel surface) the adhesive layer 16 of the variant of FIG. 5. The adhesive of the prepreg 15 is melted during the manufacturing process, by which the adhesion is obtained and the adhesive prisms 23 occur on the ends. Even in this case, a shear connection is achieved by the prepreg 15 being adhered over a certain length with the material layers 4, 5.

The variant of FIG. 7b exhibits a cladding 14 made first of all from an outermost adhesive layer 16, then a relatively long prepreg 15 and on that a relatively short prepreg 24. As a result, increasing joggles are achieved in the panel gradually towards the middle of the splice 3. Also two shear connections are achieved by laying the prepregs 15, 24 against the metal layers 4, 5.

The variant of FIG. 7c also shows a relatively long prepreg 15 and a relatively short prepreg 24 which lie directly on top of each other without placing an adhesive layer in between, however, without an outermost adhesive layer underneath (on the panel surface) as in FIG. 7b. Also in this example, gradually towards the middle of the splice 3 increasing joggles are achieved in the panel, as well as the two shear connections.

Figure 7D:
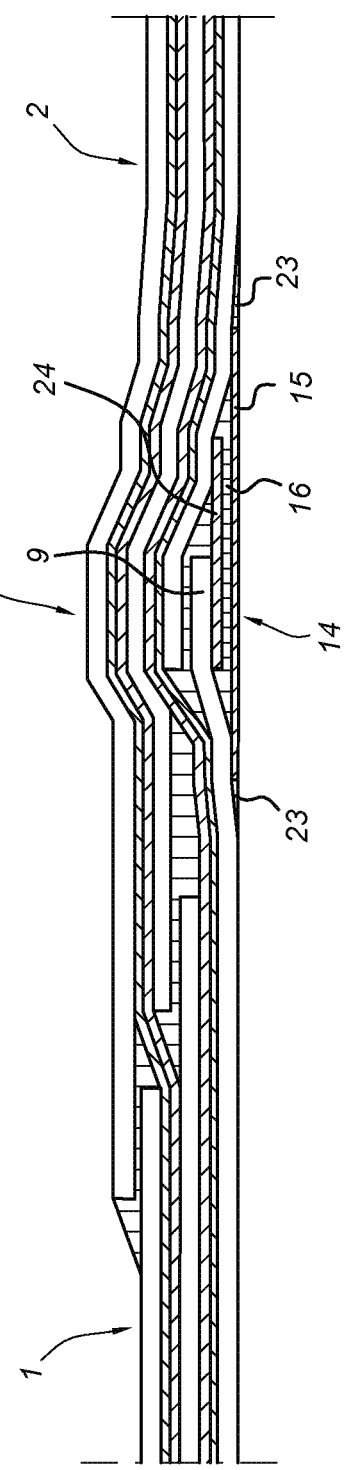

The variant of FIG. 7d exhibits a cladding 14 consisting of a relatively long prepreg 15, then an adhesive layer 16 and on that a relatively short prepreg 24. This also gives rise to joggles in the finished panel which gradually increase in size towards the middle of splice 3, and the two shear connections.

Figure 7E:
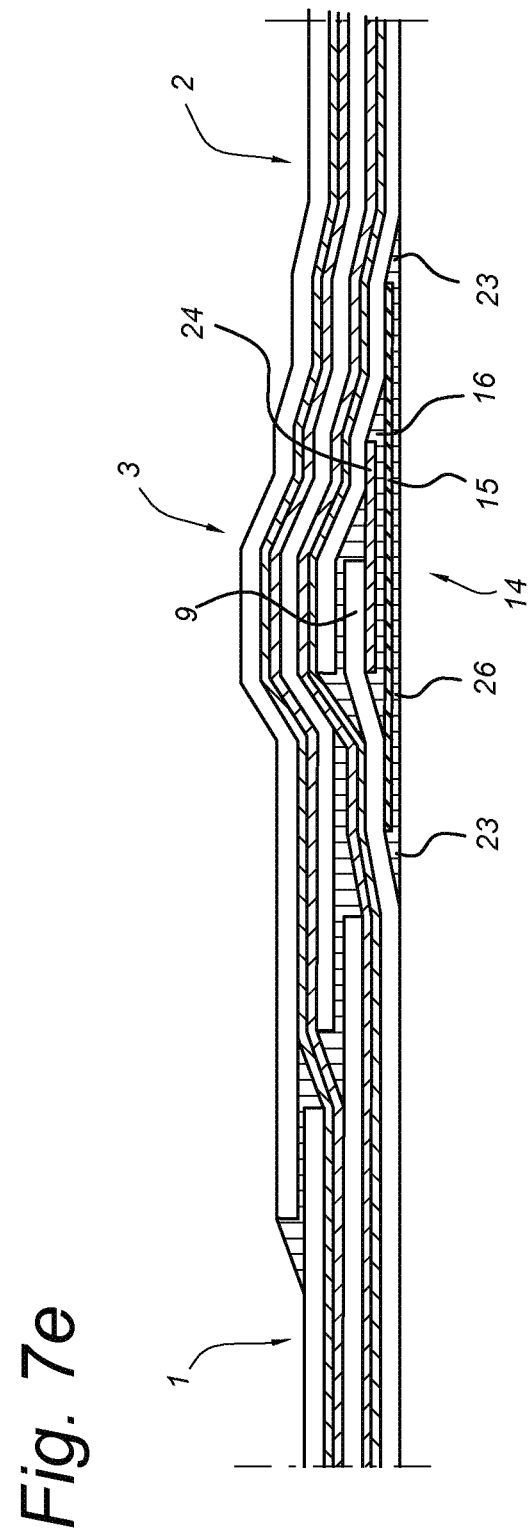

In accordance with the last variant of FIG. 7e (in relation to the variant of FIG. 7d) another extra outermost adhesive layer 26 may be added under the relatively long prepreg 16, as shown in FIG. 7e.

The invention may also be applied with the same technical advantages in laminate panels in which the outermost metal layers 4.5 are not continuous at the location of the splice 3 and are adhered overlapping each other under the formation of an outermost adhesive prism 11, and in which one or more of the other metal layers 4', 5' and/or 4", 5" are continuous at the location of the splice 3 and without overlap of adhesion pass into each other and form a single contiguous metal layer.

LIST OF REFERENCE NUMBERS

1 First laminate
2 Second laminate
3 Splice
4, 4', 4", Metal layer
5, 5', 5", Metal layer
6 Panel surface
7 Outer surface
8, 8', 8" Joggled edge section
9, 9', 9" Edge section
10, 10', 10" Adhesive, adhesive layer
10a Precursor of adhesive, precursor of adhesive layer
11 Filler or (outermost) adhesive prism
11a, 11', 11" Filler or adhesive prism
12, 13 Outer surface region
14 Cladding, cladding layer
15 Fibre-reinforced adhesive layer (prepreg)
15' Precursor of fibre-reinforced adhesive layer (prepreg)
16 Adhesive layer
16' Precursor of adhesive layer
17, 18 Joggle
19 Prepreg, fibre-reinforced adhesive layer
20 Edge of metal layer
21 Mould
22 Mould surface
23 Adhesive prism
24 Prepreg
25 Adhesion surface
26 Adhesive layer

The invention claimed is:

1. An integrated panel of interconnected laminates, comprising:
a first laminate (1); and
a second laminate (2),
the first laminate (1) comprised of stacked first metal layers (5, 5', 5") and at least one fibre-reinforced adhesive layer (19) between adjacent metal layers of the first metal layers (5, 5', 5"), and
the second laminate (2) comprised of stacked second metal layers (4, 4', 4") and at least one fibre-reinforced adhesive layer (19) between adjacent metal layers of the second metal layers (4, 4', 4"),
wherein, from the first and second metal layers, outer metal layers form outer surfaces which in turn define a continuous and uniformly formed panel surface (6), in which, of one pair of outer metal layers that comprises a first outer metal layer (5) of the first laminate (1) and a second outer metal layer (4) of the second laminate (2), the first and second outer metal layers (4, 5) each comprise adjacent joggled edge parts (8, 9) that overlap and are adhered via an adhesion surface (25) of the edge part (9) of the first outer metal layer (5) by means of an adhesive (10), which adhesion surface (25) faces away from the panel surface (6), wherein at a recessed location of transition from the outer surface (7) of the first outer metal layer (5) to the outer surface (7) to the outer surface (4) a filler (11) is located, and wherein the panel further comprises a cladding layer (14) in the recessed location of transition, which cladding layer comprises at least one fibre material layer (15, 24) extending over the filler (11) and the adjacent outer surface areas (12, 13) of the outer metal layers (5, 4) located on opposite sides of the filler (11) and being adhered to the outer surface areas (12, 13), the outer side of the cladding layer (14) formed by an adhesive layer (16) or by a fibre layer embedded in an adhesive material, and wherein an outer surface of the cladding layer (14) defines an outer surface of the panel, which coincides with the external surface (6).

2. The panel according to claim 1, wherein the at least one fibre material layer (15, 24) comprises fibres embedded in an adhesive material.

3. The panel according to claim 1, wherein the cladding layer (14) is adhered to the filler (11).

4. The panel according to claim 1, wherein the first and second laminates (1, 2) are joggled at the location of the cladding layer (14).

5. The panel according to claim 1, the fibre material layer (15, 24) comprises a fibre layer which is embedded in an adhesive material.

6. The panel according to claim 1, wherein the cladding layer (14) comprises several fibre material layers (15, 24) which are adhered to each other.

7. The panel according to claim 6, wherein a fibre material layer (15) located more outward, viewed along the outer surface, extends in relation to a more inward located fibre material layer (24).

8. The panel according to claim 7, wherein the laminates (1, 2) are joggled over a first distance at the location of a more outward located, extending fibre material layer (15), and are joggled over a second distance at the location of a more inward located fibre material layer (24).

9. The panel according to claim 1, wherein the fibre direction of the fibre material layer(s) (15, 24) is oriented transversely in relation to the edge (20) of the edge part (9) of the first outer metal layer (5).

10. The panel according to claim 1, wherein a fibre-reinforced adhesive layer (19) comprises fibres that are oriented transversely in relation to the edge (20) of the edge part (9) of the first outer metal layer (5).

11. The panel according to claim 1, wherein a fibre-reinforced adhesive layer (19) comprises fibres that are oriented in the same direction as the edges (20) of the edge part (9) of the first outer metal layer (5).

12. The panel according to claim 1, wherein the fibres of the fibre-reinforced adhesive layer(s) (19) and/or the fibres of the fibre material layer(s) (15, 24) comprise glass fibres.

13. The panel according to claim 12, wherein the fibre material layer(s) (15, 24) is formed from a prepreg of unidirectional fibres which are embedded in a matrix material.

14. The panel according to claim 1, wherein between the mutually overlapping edge parts (8, 9) of the metal layers (4, 5), the adhesive (10) comprises a supported adhesive material.

15. The panel according to claim 1, wherein the filler (11) consists of glue between both outer metal layers (4, 5).

16. The panel according to claim 1, wherein the filler (11) is prism-shaped with a triangular cross-section delimited by the inclined side of the joggled edge area (8) of the joggled second outer metal layer (4), the abutting edge (20) of the first outer metal layer (5) and the surface of the filler (11) that is covered by the cladding layer (14).

17. The panel according to claim 1, wherein the filler (11) is formed as adhesive squeezed out between the mutually overlapping edge parts (8, 9) of the outer material layers (4, 5).

18. The panel according to claim 1, in which the fibre-reinforced adhesive layer(s) (19) is/are continuously extended from the first laminate (1) into the second laminate (2).

* * * * *